July 28, 1925.
G. C. LEWIS
1,547,426
METHOD AND APPARATUS FOR PAINTING
Filed June 19, 1924
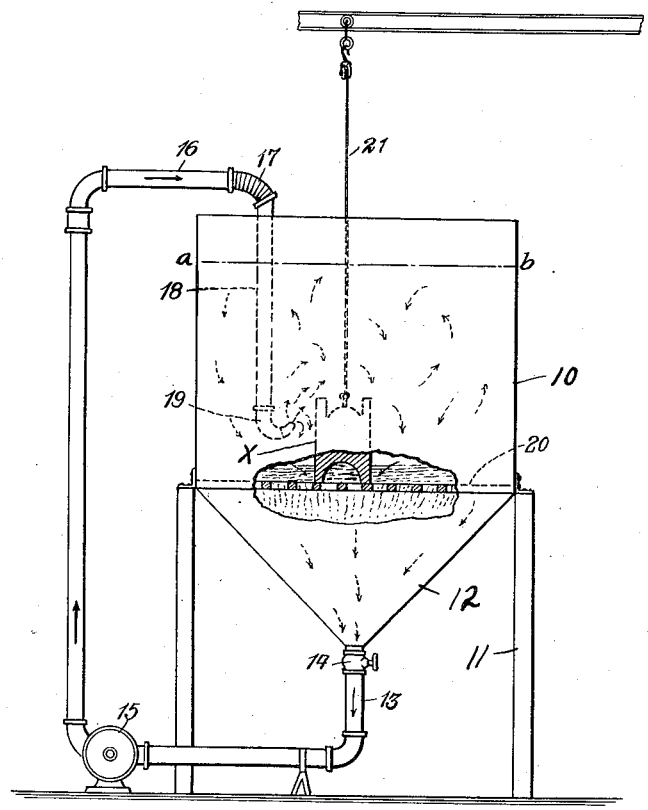
INVENTOR
George C Lewis
BY
Dean, Fairbanks, Obrig and Hirsch
ATTORNEYS July 28, 1925.
J. C. LEWIS
1,547,427
DISK TYPE VEHICLE WHEEL
Filed March 28, 1924
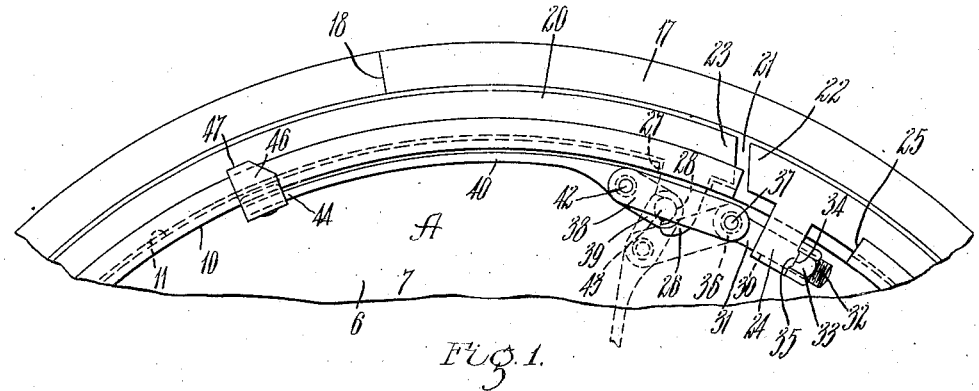

Patented July 28, 1925.

1,547,426

UNITED STATES PATENT OFFICE.

GEORGE C. LEWIS, OF NEW DORP, NEW YORK, ASSIGNOR TO COLUMBIAN CARBON COMPANY, OF WILLIAMSPORT, PENNSYLVANIA, A CORPORATION OF DELAWARE.

METHOD AND APPARATUS FOR PAINTING.

Application filed June 19, 1924. Serial No. 720,889.

*To all whom it may concern:*

Be it known that I, GEORGE C. LEWIS, a subject of the King of England, and resident of New Dorp, in the county of Richmond and State of New York, have invented certain new and useful Improvements in Methods and Apparatus for Painting, of which the following is a specification.

The present invention relates to the coating of articles by immersion in a liquid carrying finely subdivided pigment or other coating material in suspension.

The methods of applying paint by dipping and immersion commonly employed, are subject to two main disadvantages. It is necessary to use the highest and most expensive grades of paint in which the pigment is brought substantially in colloidal form, since in the cheaper grades the coarser pigment particles will slowly settle out rather than remain in suspension. Furthermore, the ordinary dipping operation fails to break down and overcome the surface tension of the liquid to a sufficient degree to give the article under treatment a real protective coating.

According to the present invention, I overcome both of these disadvantages by providing a method of painting by immersion with which the lower grades of paints may be employed and may be applied as effectively and as uniformly as can be done by brushing or spraying.

In carrying out the invention, I maintain a continuous circulation of the paint and returning the same preferably at increased pressure to a point in the tank preferably below the liquid level, and above the screen or other support of the articles. The continuous and rapid paint circulation and agitation maintains the pigments in suspension and any pigment which does settle out will be withdrawn and returned to the upper part of the liquid. By delivering the paint under pressure below the liquid level adjacent the article to be painted, I am able to utilize both pressure and the mechanical action of the swirling paint to break down surface tension and obtain a uniform coating. The danger of collecting air bubbles in the paint during the circulation of the paint is entirely eliminated since the paint circulates in a closed circuit and is in contact with the air only at the surface rather than in a spray or jet. Furthermore, the pressure and mechanical swirling and laving action will break down and carry off bubbles which may adhere to the surface of the article. By virtue of the above described process, I am able to overcome the surface tension and to efficiently use the cheaper grades of paint which can now be used only by brushing on and frequent stirring to overcome the effect of settling.

In painting metal articles I may preheat the article prior to its immersion. The sudden chilling upon contact with the paint, causes contraction of the metal surface and the slight surface change which takes place assists materially in relieving the surface tension of the paint.

The accompanying drawing is a somewhat diagrammatic side elevation of an apparatus embodying my invention, certain parts being broken away.

The apparatus includes any suitable form of comparatively deep tank 10 mounted in any suitable manner as for instance, upon standards 11. The tank is formed with a conical or hopper like bottom 12 from the apex or lowermost point of which leads a pipe 13 through which paint may be withdrawn. The withdrawal pipe 13 is provided with a shut off valve 14 and forms part of a closed liquid circulating system which includes a pump 15, a vertical pipe terminating in a swivelled hollow distributing arm 16, a flexible joint 17, a depending pipe 18 and a nozzle 19. The nozzle is disposed at some distance below the normal liquid level and above a screen, grating or other foraminous supporting member 20 which extends transversely across the tank, preferably just above the conical lower end thereof. This screen is of mesh which will permit the ready passage and free flow of the paint therethrough, but prevents the smallest article to be coated from slipping through. An article X to be coated may rest upon the grating and any suitable means such as the elevating mechanism 21 may be utilized for lowering the article into the tank and withdrawing the same therefrom, the tank being preferably open-topped to permit the ready insertion or withdrawal of articles.

It will be noted that the nozzle discharges well below the liquid level *a—b* in the tank, preferably closely adjacent the article to be painted and since the circulating system